United States Patent
Park et al.

(10) Patent No.: US 10,216,316 B2
(45) Date of Patent: Feb. 26, 2019

(54) 3-DIMENSIONAL FLAT PANEL DISPLAY WITH BUILT-IN TOUCH SCREEN PANEL

(71) Applicant: SAMSUNG DISPLAY CO., LTD., Yongin-si, Gyeonggi-do (KR)

(72) Inventors: Jong-Woong Park, Yongin-si (KR); Joo-Hyung Lee, Yongin-si (KR); Geun-Young Jeong, Yongin-si (KR); Sang-Jin Pak, Yongin-si (KR); Ji-Yeon Yang, Yongin-si (KR); Se-Il Cho, Yongin-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 65 days.

(21) Appl. No.: 15/157,652

(22) Filed: May 18, 2016

(65) Prior Publication Data

US 2016/0259477 A1 Sep. 8, 2016

Related U.S. Application Data

(63) Continuation of application No. 13/137,856, filed on Sep. 19, 2011, now Pat. No. 9,348,447.

(30) Foreign Application Priority Data

Sep. 30, 2010 (KR) .................. 10-2010-0095243

(51) Int. Cl.
*G06F 3/041* (2006.01)
*H04N 13/31* (2018.01)
(Continued)

(52) U.S. Cl.
CPC .............. *G06F 3/0416* (2013.01); *G02F 1/13* (2013.01); *G02F 1/1368* (2013.01);
(Continued)

(58) Field of Classification Search
CPC .. G02F 1/13; G02F 1/13338; G02F 1/133528; G02F 1/134309; G02F 1/1368;
(Continued)

(56) References Cited

U.S. PATENT DOCUMENTS 5,550,659 A 8/1996 Fujieda et al.
8,552,989 B2 10/2013 Hotelling et al.
(Continued)

FOREIGN PATENT DOCUMENTS

CN 101299103 A 11/2008
CN 101493593 A 7/2009
(Continued)

OTHER PUBLICATIONS

Chinese Office Action dated Feb. 14, 2014.
(Continued)

*Primary Examiner* — Tony O Davis
(74) *Attorney, Agent, or Firm* — Lee & Morse, P.C.

(57) ABSTRACT

A 3-dimensional (3D) flat panel display with a built-in touch screen panel includes a first substrate, a plurality of pixels on the first substrate, a plurality of first electrode patterns spaced apart from one another at a first predetermined interval along a first direction, the plurality of first electrode patterns for driving the plurality of pixels, a second substrate positioned to face the first substrate, and a plurality of barrier patterns formed on an outer surface of the second substrate and spaced apart from one another at a second predetermined interval along a second direction, intersecting the first direction. At least one of the plurality of first electrode patterns and at least one barrier pattern of the plurality of barrier patterns serve as electrodes for the built-in touch screen panel.

19 Claims, 6 Drawing Sheets

(51) Int. Cl.

| | | |
|---|---|---|
| *G06F 3/044* | (2006.01) | |
| *G09G 5/00* | (2006.01) | |
| *H04N 13/00* | (2018.01) | |
| *G02F 1/13* | (2006.01) | |
| *G02F 1/1333* | (2006.01) | |
| *G02F 1/1335* | (2006.01) | |
| *G02F 1/1343* | (2006.01) | |
| *G02F 1/1368* | (2006.01) | |
| *G06F 3/047* | (2006.01) | |
| *G09G 3/00* | (2006.01) | |
| *G09G 3/36* | (2006.01) | |

(52) U.S. Cl.
CPC .... *G02F 1/13338* (2013.01); *G02F 1/133528* (2013.01); *G02F 1/134309* (2013.01); *G06F 3/044* (2013.01); *G06F 3/047* (2013.01); *G06F 3/0412* (2013.01); *G09G 3/003* (2013.01); *G09G 3/3696* (2013.01); *G09G 5/00* (2013.01); *H04N 13/00* (2013.01); *H04N 13/31* (2018.05); *G06F 2203/04103* (2013.01); *G06F 2203/04107* (2013.01); *H04N 2213/001* (2013.01)

(58) Field of Classification Search
CPC . G06F 2203/04103; G06F 2203/04107; G06F 3/0412; G06F 3/0416; G06F 3/044; G06F 3/047; G09G 3/003; G09G 3/3696; G09G 5/00; H04N 13/00; H04N 13/31; H04N 2213/001
USPC .................................................. 345/170–176
See application file for complete search history.

(56) References Cited

U.S. PATENT DOCUMENTS

| | | |
|---|---|---|
| 2005/0243253 A1 | 11/2005 | Imai et al. |
| 2006/0109261 A1 | 5/2006 | Chou et al. |
| 2009/0185088 A1 | 7/2009 | Shinohara |
| 2010/0164901 A1 | 7/2010 | Chen et al. |
| 2010/0182273 A1 | 7/2010 | Noguchi et al. |
| 2010/0214262 A1 | 8/2010 | Ishizaki et al. |
| 2010/0295284 A1* | 11/2010 | Mannebach ............ B60R 21/38 280/748 |
| 2010/0295824 A1* | 11/2010 | Noguchi ............. G02F 1/13338 345/175 |
| 2010/0321621 A1 | 12/2010 | Kikuchi et al. |
| 2011/0057908 A1 | 3/2011 | Park et al. |
| 2011/0316846 A1 | 12/2011 | Su et al. |
| 2012/0327005 A1* | 12/2012 | Hamada ................ G06F 3/0412 345/173 |

FOREIGN PATENT DOCUMENTS

| | | |
|---|---|---|
| CN | 101501618 | 8/2009 |
| JP | 7-36017 A | 2/1995 |
| JP | 2008-165434 | 7/2008 |
| JP | 2009-169330 | 7/2009 |
| JP | 2009-244958 | 10/2009 |
| JP | 2010-197576 | 9/2010 |
| JP | 2012-064027 | 3/2012 |
| KR | 10-2005-0034850 A | 4/2005 |
| KR | 10 2007-0044479 A | 4/2007 |
| KR | 10-0824539 B1 | 4/2008 |
| KR | 10 2009-0019902 A | 2/2009 |
| KR | 10-2009-0080487 A | 7/2009 |
| TW | I224207 | 11/2004 |
| TW | I296383 B | 5/2008 |
| TW | 200846990 A | 12/2008 |
| TW | 201025104 A1 | 7/2010 |
| WO | WO 2009/069358 A1 | 6/2009 |

OTHER PUBLICATIONS

Japanese Office Action dated Jun. 17, 2014.
Korean Notice of Allowance for 10-2010-0095246 (Park, et al.) dated Aug. 28, 2012.
Korean Office Action for 10-2010-0095246 (Park, et al.) dated Jan. 31, 2012.
Taiwanese Patent Gazette (TW I471916-B) dated Feb. 1, 2015 for Taiwanese Patent Application No. 100134835.

* cited by examiner

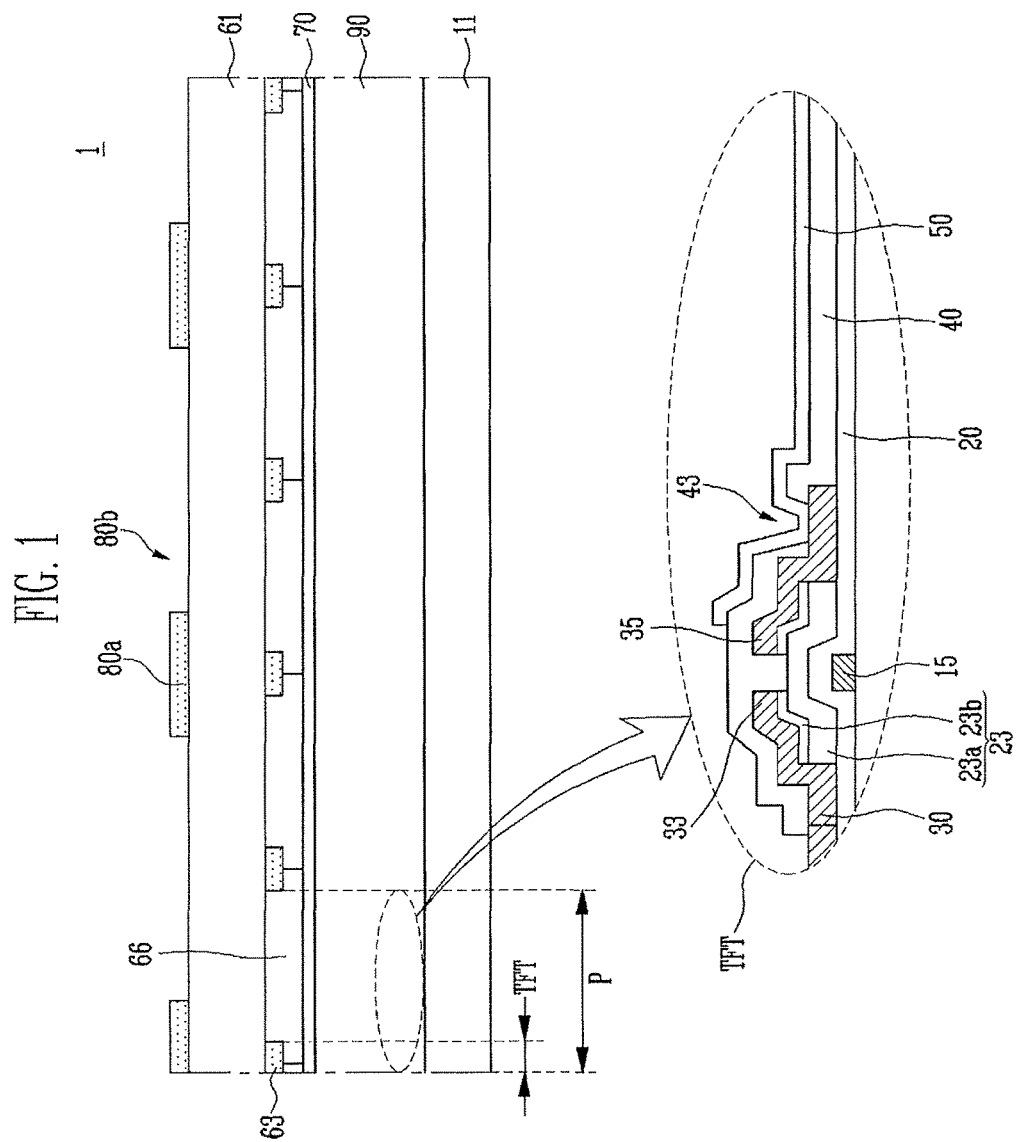

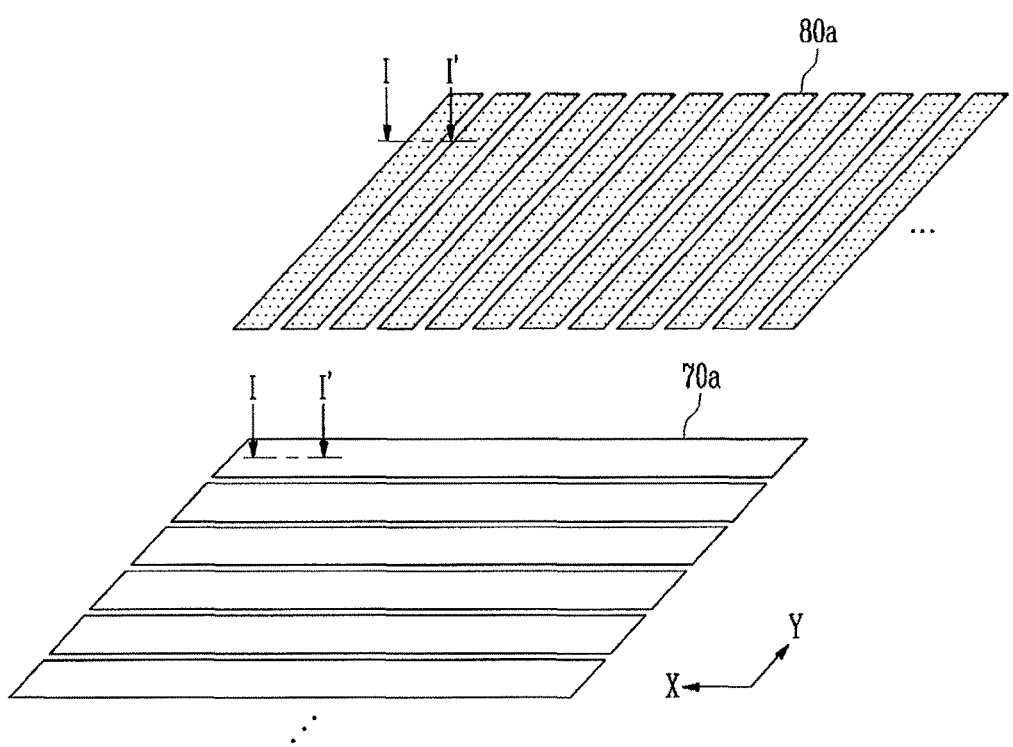

3-DIMENSIONAL FLAT PANEL DISPLAY WITH BUILT-IN TOUCH SCREEN PANEL

CROSS REFERENCE TO RELATED APPLICATION

This is a continuation application based on pending application Ser. No. 13/137,856, filed Sep. 19, 2011, the entire contents of which is hereby incorporated by reference.

BACKGROUND

1. Field

Embodiments relate to a flat panel display, and more particularly, to a flat panel display with a built-in touch screen panel, which displays a stereoscopic image.

2. Description of the Related Art

A touch screen panel is an input device that allows a user's instruction to be input by selecting an instruction content displayed on a screen of a display or the like with a user's hand or object.

To this end, the touch screen panel is formed on a front face of the display to convert a contact position into an electrical signal. Here, the user's hand or object is directly in contact with the touch screen panel at the contact position. Upon contact, the instruction content selected at the contact position is input to the display. Since such a touch screen panel can be substituted for a separate input device, e.g., a keyboard or mouse, use thereof has been increasing.

Touch screen panels include a resistive overlay touch screen panel, a photosensitive touch screen panel, a capacitive touch screen panel, and the like. The capacitive touch screen panel converts a contact position into an electrical signal by sensing a change in capacitance formed between a conductive sensing pattern and an adjacent sensing pattern, ground electrode, or the like when a user's hand or object is in contact with the touch screen panel. Generally, such a touch screen panel is attached to an outer surface of a flat panel display such as a liquid crystal display or organic light emitting display.

Recently, demands on a flat panel display for implementing 3-dimensional (3D) stereoscopic images have been considerably increased.

Generally, a stereoscopic image for expressing three dimensions depends on a stereo vision principle through two eyes. Here, a parallax of two eyes, i.e., a binocular parallax due to a separation between eyes of a typical human, e.g., about 65 mm, is the most important factor of a 3D effect. That is, when left and right eyes view correlated 2D images, respectively, the distinct 2D images are transmitted to the brain. Then, the brain combines the 2D images and reproduces the depth effect to realize a 3D image. Such a phenomenon is referred to as a stereography.

Several technologies for expressing 3D stereoscopic images using a 2D screen are available. On technology is a parallax barrier type 3D display, in which stereo images for left/right eyes are separately viewed to implement 3D images.

In the principle of displaying 3D stereoscopic images in a general parallax barrier type 3D display, an observer's stereography is induced by overlapping slit-shaped openings vertically arranged with respect to an observer on a 2D image in which image information for left/right eyes is displayed, so that a 3D image is viewed by the observer. To this end, the parallax barrier type 3D display requires a flat panel display for displaying 2D images and a separate barrier panel for forming slit-shaped openings.

In order to implement the aforementioned touch recognition and stereoscopic images, separate touch screen panel and a barrier panel are attached to outer surfaces of a flat panel display, respectively.

SUMMARY

According to an embodiment, a 3D flat panel display with a built-in touch screen panel, includes a first substrate, a plurality of pixels on the first substrate, a plurality of first electrode patterns spaced apart from one another at a first predetermined interval along a first direction, the plurality of first electrode patterns for driving the plurality of pixels, a second substrate positioned to face the first substrate, and a plurality of barrier patterns formed on an outer surface of the second substrate and spaced apart from one another at a second predetermined interval along a second direction, intersecting the first direction, wherein at least one of the plurality of first electrode patterns and at least one barrier pattern of the plurality of barrier patterns serve as electrodes for the built-in touch screen panel.

The plurality of first electrode patterns may be formed on an inner surface of the second substrate.

The plurality of first electrode patterns may be formed on the outer surface of the second substrate.

An insulating layer may be between the first electrode patterns and the barrier patterns.

The plurality of pixels may include left eye pixels that display image information for a left eye and right eye pixels that display image information for a right eye, the left eye pixels and the right eye pixels being alternately formed.

The plurality of barrier patterns and transmission regions between the plurality of barrier patterns may allow light respectively from the pixels for left and right eyes to be selectively shielded or transmitted.

The built-in touch screen panel may be a capacitive touch screen panel.

The first electrode patterns may serve as driving electrodes of a mutual capacitive touch screen panel and the at least one barrier pattern may serve as sensing electrodes of the mutual capacitive touch screen panel.

A same voltage may be applied to the first electrode patterns during a first frame period in which the flat panel display performs an operation of displaying a predetermined image, and a driving signal may be sequentially applied to the first electrode patterns during a second frame period in which the flat panel display performs touch recognition.

The first and second frame periods may be alternately repeated.

The first and second frame periods may not overlap.

The 3D flat panel display may further include a voltage application pad connected to each of the first electrode patterns and a voltage detection pad connected to the at least one barrier pattern.

The voltage detection pad may be electrically connected to only individual barrier patterns spaced apart further than the second predetermined interval or adjacent two or more barrier patterns spaced apart by the second predetermined interval.

The barrier patterns not connected to a voltage detection pad may be implemented in a floating state or have a ground voltage applied thereto.

The adjacent barrier patterns may be connected to the same voltage detection pad so as to serve as one sensing electrode.

A width of each of the first electrode patterns at a portion that intersects the barrier patterns connected to a voltage detection pad may be adjusted to minimize an area of the portion of the first electrode patterns intersecting the barrier patterns connected to a voltage detection pad.

The width of the first electrode patterns at a portion intersecting barrier patterns connected to a voltage detection pad may be narrower than a width of the first electrode patterns at a portion intersecting other barrier patterns.

All of the barrier patterns may serve as sensing electrodes for the built-in touch screen panel.

The plurality of first electrode patterns may together serve as a common electrode during a display operation.

A width of the first electrode patterns at a region intersecting barrier patterns serving as electrodes for the built in touch screen may be narrower than a width of the first electrode patterns at a region intersecting other barrier patterns.

BRIEF DESCRIPTION OF THE DRAWINGS

The above and other features and advantages will become more apparent to those of ordinary skill in the art by describing in detail exemplary embodiments with reference to the attached drawings, in which:

FIG. 1 illustrates a sectional view showing a region of a 3-dimensional flat panel display with a built-in touch screen panel according to an embodiment.

FIG. 2 illustrates a perspective view showing the structure of first electrode patterns and barrier patterns in the flat panel display shown in FIG. 1.

DETAILED DESCRIPTION

Figure 3A:
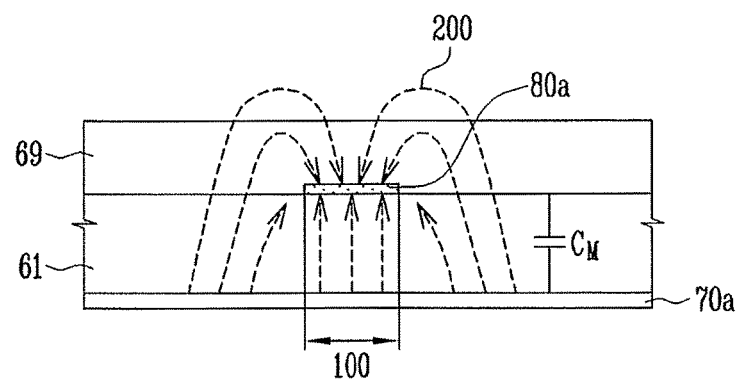
FIG. 3A illustrates a sectional view of a sensing cell in the condition of a normal state (no touch).

Korean Patent Application No. 10-2010-0095243, filed on Sep. 30, 2010, in the Korean Intellectual Property Office, and entitled: "3-Dimensional Flat Panel Display with Built-in Touch Screen Panel" is incorporated by reference herein in its entirety.

In the following detailed description, only certain exemplary embodiments have been shown and described, simply by way of illustration. As those skilled in the art would realize, the described embodiments may be modified in various different ways, all without departing from the spirit or scope of the present inventive concept. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments will be described in detail with reference to the accompanying drawings. In the following embodiments, touch recognition and stereoscopic images are implemented using a liquid crystal display (LCD). However, these details are provided only for illustrative purposes, and a flat panel display according to the embodiments is not limited to an LCD.

General Overview of LCD Operation

An LCD displays an image using light modulating properties of liquid crystals. Liquid crystals have an elongated molecular structure and exhibit optical anisotropy in which the molecular arrangement of the liquid crystals is directionally oriented and a polarizing property in which the molecular arrangement direction of the liquid crystals is changed according to a magnitude of an electric field across the liquid crystals.

The liquid crystal panel is configured by joining a first substrate (array substrate) and a second substrate (color filter substrate) respectively having pixel electrodes and a common electrode, formed on surfaces opposite to each other with a liquid crystal layer interposed therebetween. The LCD is a non-luminescent device, i.e., needs a back light for illumination. The LCD controls the arrangement direction of liquid crystal molecules through a change in electric field between the pixel and common electrodes. By controlling the voltage applied across the liquid crystal layer in each pixel, light can be allowed to pass through in varying amounts thus constituting different gray levels accordingly.

Embodiments

FIG. 1 is a sectional view showing a region of a 3-dimensional flat panel display with a built-in touch screen panel according to an embodiment of the present invention. FIG. 2 is a perspective view showing the structure of first electrode patterns and barrier patterns in the flat panel display shown in FIG. 1.

As shown in FIG. 1, a display 1, e.g., an LCD, includes a first substrate 11, e.g., an array substrate, and a second substrate 61, e.g., a color filter substrate facing one another with a display layer 90, e.g., a liquid crystal layer, therebetween. The lower first substrate 11 may include a plurality of gate lines (not shown) and a plurality of data lines (not shown), which are vertically and horizontally arranged to intersect each other on a front surface of the first substrate 11, i.e., between the first substrate 11 and the display layer 90. Pixel regions P may be formed at the intersections of the data and gate lines. For example, pixel regions P may include thin film transistors TFT at the intersections of the gate and data lines, which, in turn, are to be connected to pixel electrodes 50.

The thin film transistor TFT includes a gate electrode 15 connected to the gate line (not shown), source/drain electrodes 33 and 35, and a semiconductor layer 23 formed between the gate electrode 15 and the source/drain electrodes 33 and 35. The semiconductor layer 23 includes an active layer 23a and an ohmic contact layer 23b.

A gate insulating layer 20 is formed on the gate electrode 15. A protection layer 40 is formed on the source/drain electrodes 33 and 35. The drain electrode 35 is exposed through a contact hole 43 in the protection layer 40. The pixel electrode 50 is formed on the protection layer 40 and is connected to the drain electrode 35 through the contact hole 43. The arrangement of liquid crystal molecules in the liquid crystal layer 90 between the pixel electrode 50 and the first electrode 70 is controlled in accordance with a voltage corresponding to the difference between the voltages respectively applied to the pixel electrode 50 and the first electrode 70, thereby displaying a predetermined image.

The upper second substrate 61 opposite to the first substrate 11 includes a lattice-shaped black matrix 63 that surrounds each of the pixel regions P so as to cover a non-display region including the gate lines, the data lines, the thin film transistors, and the like. The upper second substrate 61 may also include color filter patterns 66 arranged to correspond to the respective pixel regions P in the interior of the black matrix 63. The upper second substrate 61 may further include a first electrode 70 serving as a common electrode formed of a transparent conductive material beneath the color filter patterns 66.

In FIG. 1, the black matrix 63, the color filter patterns 66, and the first electrode 70 are formed on the rear surface of the second substrate 61. However, the first electrode 70 may be formed on the first substrate 11 rather than the second substrate 61 according to the driving method of the LCD (e.g., an in-plane switching (IPS) method, fringe field switching (FFS) method, or the like).

An overcoat layer (not shown) may be further formed between the color filter patterns 66 and the first electrode 70. The color filter patterns 66 may include red, green, and blue color filter patterns sequentially and repeatedly arranged.

More Detailed Overview of LCD Operation

The image display operation of the LCD having such a configuration will be briefly described as follows.

First, if a gate signal is applied to the gate electrode 15 of the thin film transistor TFT formed in each of the pixel regions P, the active layer 23a is activated. Accordingly, the drain electrode 35 receives a data signal applied from a data line 30 connected to the source electrode 33 through the source electrode 33 spaced apart from the drain electrode 35 at a predetermined distance via the lower active layer 23a.

Since the drain electrode 35 is electrically connected to the pixel electrode 50 through the contact hole 43, the voltage of the data signal is applied to the pixel electrode 50. The arrangement of liquid crystal molecules in the liquid crystal layer 90 between the pixel electrode 50 and the first electrode 70 is controlled in accordance with a voltage corresponding to the difference between the voltages respectively applied to the pixel electrode 50 and the first electrode 70, thereby displaying a predetermined image.

Embodiments Continued

In order for the LCD according to this embodiment to display a 3-dimensional (3D) stereoscopic image, the LCD includes a plurality of barrier patterns 80a on a front surface of the second substrate 61, i.e., a surface of the second substrate 61 closest to a viewer.

The barrier patterns 80a are arranged at a predetermined interval so that light transmitted to a specific pixel reaches an observer's right or left eye according to the arrangement of the pixels P. In this instance, the thickness of the second substrate 61 and the interval (transmission region (slit) 80b) between the barrier patterns 80a are determined based on the size of the liquid crystal panel and/or the observer's distance (design value) from the liquid crystal panel. The barrier patterns 80a are made of an opaque material, e.g., an opaque metallic material, which prevents light from being transmitted there through.

Overview of Parallax

The principle that a 3D stereoscopic image is displayed by forming the barrier patterns 80a will be briefly described as follows.

In order to display the 3D stereoscopic image, the pixels P arranged in the display panel include left eye pixels that display image information for left eye and right eye pixels that display image information for right eye. Here, the left eye pixels and the right eye pixels are alternately arranged in the display panel. When the display is a non-transmissive display, e.g., an LCD, a back light (not shown) is provided to the bottom surface of the first substrate 11.

The plurality of barrier patterns 80a arranged on the outer surface of the second substrate 61 and the transmission regions (slits) 80b allow light respectively from the pixels for left and right eyes to be selectively shielded or transmitted. Accordingly, light output from the left eye pixel of the display panel approaches the observer's left eye via the slit 80b between the barrier patterns 80a, and light output from the right eye pixel of the display panel approaches the observer's right eye via the slit 80b between the barrier patterns 80a.

Sufficient parallax information that can be adequately sensed by the observer exists in an image displayed through the pixels for left and right eyes, so that the observer can recognize a 3D stereoscopic image.

Embodiments Continued

In this embodiment, unlike the conventional 3D flat panel display, a separate panel having a barrier layer formed therein is not attached to the display panel, but the barrier patterns 80a are directly formed on the front surface of the second substrate 61. Accordingly, the barrier patterns 80a are formed between the second substrate 61 and a polarizing plate 69 (shown in FIGS. 3A and 4A).

Thus, in this embodiment, a separate substrate or an adhesive layer having the substrate attached thereto is not formed between the barrier patterns 80a and the display layer 90, and hence the distance between the barrier patterns 80a and the display layer 90 is not changed. Since the number of interfaces that exist between the barrier patterns 80a and the display layer 90 is smaller than that in the conventional 3D flat panel display, it is possible to minimize the degradation of light efficiency due to reflection or the like.

Additionally, in a conventional LCD, a common electrode is integrally formed with a second substrate on the entire lower surface of the second substrate to receive the same voltage, i.e., the common electrode is a single electrode. However, in the LCD according to the embodiment shown in FIG. 2, the first electrode 70, which serves as the common electrode, is formed with a plurality of patterns 70a separated from one another, so that the first electrode patterns 70a and the barrier patterns 80a are used as electrodes of a capacitive touch screen panel.

For example, as shown in FIG. 2, the first electrode 70 may be formed with a plurality of patterns 70a spaced apart from one another at a predetermined interval along a first direction (e.g., an X-axis direction), and the barrier patterns 80a may be spaced apart from one another at a predetermined interval along a second direction (e.g., a Y-axis direction) that intersects the first direction.

The first electrode patterns 70a may be formed of a transparent conductive material and the barrier patterns 80a may be formed of an opaque metallic material. The color filter patterns 66 and the second substrate 61 that serve as dielectric substances are formed between the first electrode patterns 70a and the barrier patterns 80a.

The first electrode patterns 70a and the barrier patterns 80a may be used as electrodes of the capacitive touch screen panel. As described below, the first electrode patterns 70 are used as driving electrodes and the barrier patterns 80a are used as sensing electrodes of the capacitive touch screen panel. While these electrodes will be used as mutual capacitive electrodes below, embodiments are not necessarily limited thereto. That is, the patterns may be used as self capacitive electrodes.

Mutual capacitances ($C_M$) between driving and sensing electrodes are formed at intersection points of the driving electrodes 70a and the sensing electrodes 80a, respectively. The intersection points, i.e., at which the mutual capacitances are formed, serve as sensing cells for implementing touch recognition.

In a case where a driving signal is applied to the driving electrode 70a connected to each of the sensing cells, the mutual capacitance generated in each of the sensing cells generates a sensing signal subjected to coupling to the sensing electrode 80a connected to each of the sensing cells.

The driving signal is sequentially applied to the driving electrodes 70a during one frame period. Therefore, when the driving signal is applied to any one of the driving electrodes, the other driving electrodes maintain a ground state.

Thus, mutual capacitances are respectively formed at a plurality of intersection points, i.e., sensing cells, where a plurality of sensing lines intersect the driving line to which the driving signal is applied. In a case where a finger or the like comes in contact with each of the sensing cells, a change in capacitance is generated in the corresponding sensing cell, and this change in capacitance is sensed.

Through the configuration described above, this embodiment can implement a display panel in which a mutual capacitive touch screen panel is built-in.

The same voltage may be applied to the first electrode patterns 70a during a first frame period in which the LCD performs an operation for displaying an image, i.e., the first electrode patterns may 70a may together serve as a common electrode during display operation, and a driving signal may be sequentially applied to the first electrode patterns 70a during a second frame period in which the LCD performs touch recognition. The first and second frame periods may not overlap with each other. For example, the first and second frame periods may be alternately repeated.

Hereinafter, the operation of the mutual capacitive touch screen panel will be described in a more detail.

Figure 3B:
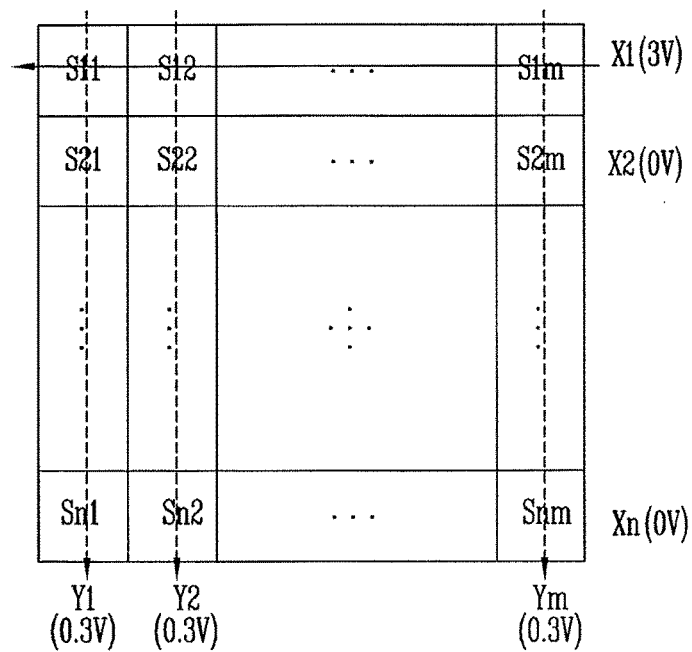
FIG. 3B illustrates a view schematically showing a sensed result based on a driving signal applied to each sensing cell in FIG. 3A.

FIG. 3A is a sectional view of a sensing cell in the condition of a normal state (no touch). FIG. 3B is a view schematically showing a sensed result based on a driving signal applied to each sensing cell in FIG. 3A.

FIG. 3A is a sectional view showing a region (I-I') of the perspective view shown in FIG. 2. Referring to FIG. 3A, electric field lines 200 illustrate mutual capacitances between the driving electrode 70a and the sensing electrode 80a, separated from each other by a dielectric, e.g., the second substrate 61.

The driving electrode 70a is one of the first electrode patterns separated from one another as described above with reference to FIG. 2. The sensing electrode 80a corresponds to the barrier pattern that intersects the first electrode pattern 70a.

Thus, as shown in FIG. 3A, the sensing electrode 80a is formed on the front surface of the second substrate 61, the polarizing plate 69 is formed on the sensing electrode 80a, and the driving electrode 70a is formed on a bottom surface of the second substrate 61.

A sensing cell 100 is defined at the point at which the driving and sensing electrodes 70a and 80a intersect. As shown in FIG. 3A, a mutual capacitance $C_M$ is formed between the driving and sensing electrodes 70a and 80a, corresponding to the sensing cell 100.

The mutual capacitance $C_M$ generated in each of the sensing cells 100 is generated in a case where a driving signal is applied to the driving electrode 70a connected to each of the sensing cells 100.

That is, referring to FIG. 3B, a driving signal (e.g., a voltage of 3V) is sequentially applied to each of the driving electrodes X1, X2, . . . and Xn. In a case where the driving signal is applied to any one of the driving electrodes X1, X2, . . . and Xn, the other driving electrodes are maintained at a different voltage, e.g., at a ground state. In FIG. 3B, the driving signal is applied to the first driving electrode X1.

Thus, mutual capacitances are respectively formed at a plurality of intersection points by a plurality of sensing electrodes Y1 to Ym that intersect the first driving electrode X1 to which the driving signal is applied, i.e., sensing cells S11, S12, . . . and S1m. Accordingly, a voltage (e.g., 0.3V) corresponding to the mutual capacitance is sensed by sensing electrodes Y1, Y2, . . . , Ym connected to each of the sensing cells to which the driving signal is applied.

Figure 4A:
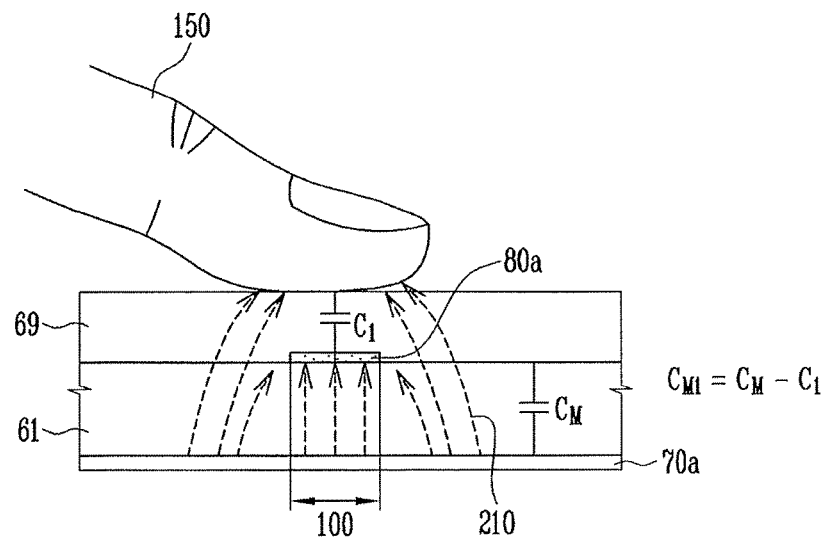
FIG. 4A illustrates a sectional view of a sensing cell in the condition of a contact.
Figure 4B:
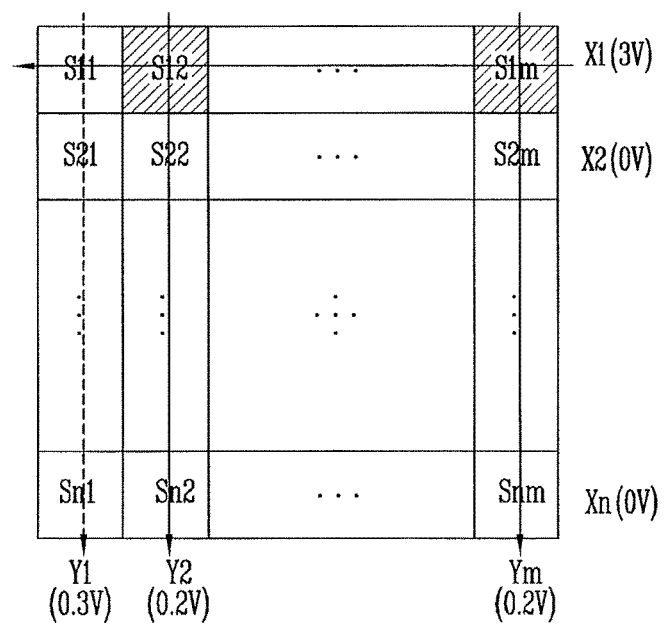
FIG. 4B illustrates a view schematically showing a sensed result based on a driving signal applied to each sensing cell in FIG. 4A.

FIG. 4A is a sectional view of a sensing cell that is being contacted, e.g., by a finger. FIG. 4B is a view schematically showing a sensed result based on a driving signal applied to each sensing cell in FIG. 4A.

Referring to FIG. 4A, if a low impedance object 150, e.g., a finger, contacts at least one sensing cell 100, an AC capacitance $C_1$ from the sensing electrode 80a is provided to a human body. The human body has a self capacitance that is much greater than $C_1$, e.g., a self capacitance of about 200 pF with respect to ground.

As illustrated in FIG. 4A, when the finger 150 is in contact, the driving and sensing electrodes 70a and 80a are shielded, and the electric field lines 210 are directed to ground through a capacitance path through the finger 150 and the human body. As a result, the mutual capacitance $C_M$ in the normal state shown in FIG. 3A is decreased by the $C_1$ ($C_{M1}=C_M-C_1$). This change in mutual capacitance in each of the sensing cells 100 changes the voltage provided to the sensing electrode 80a connected to the sensing cell 100.

As shown in FIG. 4B, a driving signal (e.g., a voltage of 3V) is sequentially applied to each of the driving electrodes X1, X2, . . . and Xn, so that mutual capacitances $C_M$ are respectively formed in the plurality of sensing cells S11, S12, . . . and S1m by the plurality of sensing lines that intersect the first driving electrode X1 to which the driving signal is applied. If one or more sensing cells (e.g., S12 and S1m) are contacted by the finger 150, the mutual capacitance is decreased ($C_{M1}$). Therefore, a decrease in voltage (e.g., 0.1V) corresponding to the decreased mutual capacitance is sensed by the sensing electrodes Y2 and Ym respectively connected to the contacted sensing cells S12 and S1m.

Since the existing mutual capacitance $C_M$ is maintained in the other sensing cells connected to the first driving electrode X1, but not contacted by the finger 150, the existing voltage (e.g., 0.3V) is sensed by the sensing electrodes respectively connected to the other sensing cells. Thus, a precise touch position can be sensed through the difference of voltages applied to the sensing electrodes.

Figure 5A:
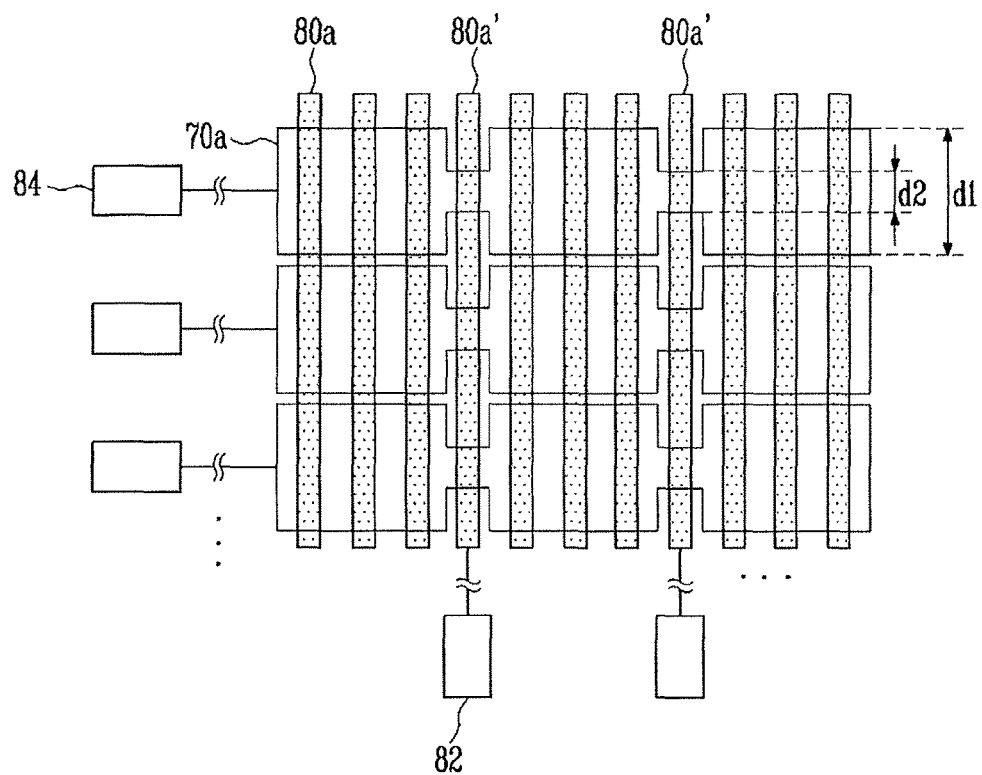
FIGS. 5A and 5B illustrate plan views showing structures of first electrode patterns and barrier patterns according to embodiments.
Figure 5B:
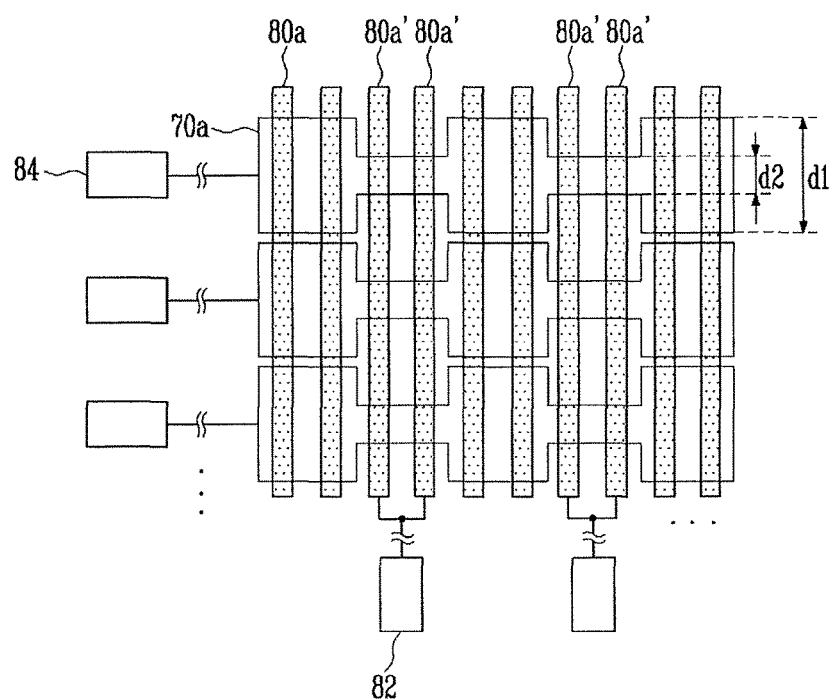

FIGS. 5A and 5B are plan views showing structures of first electrode patterns and barrier patterns according to embodiments. The embodiments shown in FIGS. 5A and 5B are different from the embodiment shown in FIG. 2 in that the barrier patterns 80*a* do not all serve as sensing electrode of the touch screen panel, but only some barrier patterns 80*a*' of the plurality of barrier patterns 80*a* are used as sensing electrodes.

In the embodiments shown in FIGS. 5A and 5B, the first electrode patterns 70*a* are formed on the same plane as the barrier patterns 80*a* and 80*a*' so as to be used as driving and sensing electrodes of the touch screen panel. In other words, the first electrode patterns 70*a* are formed on the same surface, i.e., the upper surface, of the second substrate 61 as the barrier patterns 80*a* and 80*a*'. In this case, as the second substrate 61 no longer insulates the first electrode patterns 70*a* from the barrier patterns 80*a* and 80*a*', an insulating layer (not shown) is formed between the first electrode patterns 70*a* and the barrier patterns 80*a* and 80*a*'.

Each of the barrier patterns 80*a*, 80*a*' is generally disposed every adjacent two pixels so as to implement a 3D stereoscopic image. When also using the barrier patterns 80*a*, 80*a*' as part of the touch screen panel, this is disadvantageous, in that the interval between the barrier patterns/sensing electrodes is narrow.

Accordingly, in the embodiments shown in FIGS. 5A and 5B, only the some barrier patterns 80*a*' of the barrier patterns 80*a* are used as sensing electrodes. The other barrier patterns 80*a* perform only a barrier function for implementing a 3D stereoscopic image.

In other words, voltage detection pads 82 are electrically connected the respective barrier patterns 80*a*' used as sensing electrodes, while other barrier patterns 80*a* are in a floating state. Therefore, no voltage or a ground voltage (GND) is applied to the other barrier patterns 80*a*.

Voltage application pads 84, which sequentially apply a driving signal to the first electrode patterns 70*a* in response to a voltage, are individually electrically connected to the first electrode patterns 70*a* used as driving electrodes. As noted above, the voltage application pads 84 may apply the same driving signal to the first electrode patterns 70*a* when in a display mode.

In this instance, each of the barrier patterns 80*a*' spaced apart from one another at a predetermined interval may be used as the sensing electrode as shown in the embodiment of FIG. 5A, or adjacent two or more barrier patterns 80*a*' spaced apart at a predetermined interval may be used as the sensing electrode as shown in the embodiment of FIG. 5B. In the embodiment of FIG. 5B, the adjacent barrier patterns 80*a*' are connected to the same voltage detection pad 82 so as to serve as one sensing electrode.

As shown in FIGS. 5A and 5B, widths d1 and d2 of the first electrode patterns 70*a* may be adjusted so that the area of the first electrode patterns 70*a* that intersects the barrier pattern 80*a*' is minimized. In other words, the width d2 of the first electrode patterns 70*a* at a portion intersecting barrier patterns 80*a*' is narrower than the width d1 of the first electrode patterns 70*a* at a portion intersecting other barrier patterns 80*a*.

In the mutual capacitive touch screen panel, the width of the driving electrodes is minimized at an intersection portion of the sensing and driving electrodes, so that touch sensitivity can be increased by decreasing the capacitance (Cnode) generated at the intersection portion.

In the conventional structure of the parallax barrier type 3D display, the touch screen panel and the barrier panel are attached to the outer surfaces of the flat panel display, respectively, and therefore, the entire thickness of the flat panel display is increased. Further, when using separate panels to realize the flat panel display, the touch screen panel, and the barrier panel, a process of forming the touch screen panel and the barrier panel is required separately from the flat panel display. Therefore, processing time and cost are increased.

By way of summation and review, according to exemplary embodiments, a 3-dimensional (3D) flat panel display with a built-in touch screen panel uses a plurality of first electrode patterns of the flat panel display and a plurality of barrier patterns arranged on an outer surface of the flat panel display as electrodes of a capacitive touch screen panel. Thus, according to exemplary embodiments, a 3-dimensional (3D) flat panel display with a built-in touch screen panel may be realized without an additional processes or substrate, allowing reduced cost and/or thickness. Further, according to exemplary embodiments, a reduced number of optical interfaces may improve performance.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A display with a touch sensor, the display comprising:
a first substrate;
a plurality of pixels on the first substrate;
a second substrate including a first surface facing the first substrate and a second surface opposite the first surface;
a plurality of first electrodes between the first and second substrates; and
a plurality of second electrodes on the second surface of the second substrate,
wherein at least one of the first electrodes and the second electrodes serves as electrodes for the touch sensor,
at least one of the first electrodes receives a driving signal which generates a sensing signal of the sensing electrodes,
the first electrodes receive a reference voltage in a first frame and
the at least one of the first electrodes receives the driving signal for touch recognition in a second frame.

2. The display as claimed in claim 1, wherein the touch sensor is a capacitive touch sensor.

3. The display as claimed in claim 1, wherein the first electrodes is provided on an inner surface of the first or second substrates.

4. The display as claimed in claim 1, further comprising a color filter between the first electrodes and the second substrate.

5. The display as claimed in claim 1, wherein
the first electrodes serve as driving electrodes of a mutual capacitive touch sensor, and
the at least one of second electrodes serves as sensing electrodes of the mutual capacitive touch sensor.

6. The display as claimed in claim 5, wherein a driving signal is applied to the at least one of the first electrodes.

7. The display as claimed in claim 1, wherein the first and second frames are alternate frames.

8. The display as claimed in claim 1, wherein remaining electrodes of the first electrodes apart from the at least one of the first electrodes receive a ground voltage in the second frame.

9. The display as claimed in claim 1, wherein the display displays an image in the first frame and the display performs touch recognition in the second frame.

10. The display as claimed in claim 1, further comprising a polarizing plate on the second substrate.

11. The display of claim 10, wherein the second electrodes are between the second substrate and the polarizing plate.

12. The display as claimed in claim 1, wherein each pixel comprises:
a transistor on the first substrate;
a third electrode on the first substrate, the third electrode connected to the transistor; and
a liquid crystal layer between the first substrate and the second substrate.

13. The display of claim 12, wherein the first electrode is configured to generate a field together with the third electrode.

14. The display as claimed in claim 12, wherein the first electrodes are provided between the liquid crystal layer and the second substrate.

15. The display as claimed in claim 12, wherein the first electrodes are provided between the liquid crystal layer and the first substrate.

16. The display as claimed in claim 1, wherein
the first electrodes are spaced apart from one another at a first interval along a first direction, and
the second electrodes are spaced apart from one another at a second interval along a second direction intersecting the first direction.

17. A display with a touch sensor, the display comprising: a first substrate; a plurality of pixels on the first substrate; a dielectric layer including a first surface facing the first substrate and a second surface opposite the first surface; a plurality of first electrodes between the first substrate and the dielectric layer; and a plurality of second electrodes on the second surface of the dielectric layer, wherein at least one of the plurality of first electrodes and at least one second electrodes serve as electrodes for the touch sensor, wherein the dielectric layer is a color filter, and wherein the first electrodes serve as driving electrodes of a mutual capacitive touch sensor, and the at least one of second electrodes serves as sensing electrodes of the mutual capacitive touch sensor-.

18. The display as claimed in claim 17, wherein the touch sensor is a capacitive touch sensor.

19. The display as claimed in claim 17, wherein the dielectric layer is a second substrate.

* * * * *